(12) United States Patent
Cresswell

(10) Patent No.: US 6,667,735 B2
(45) Date of Patent: Dec. 23, 2003

(54) AQUA KEYBOARD

(75) Inventor: William H Cresswell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 10/001,391

(22) Filed: Oct. 30, 2001

(65) Prior Publication Data

US 2003/0080943 A1 May 1, 2003

(51) Int. Cl.[7] .................................................. G09G 5/00
(52) U.S. Cl. ........................................ 345/168; 345/156
(58) Field of Search ............................... 345/156–157, 345/168–172

(56) References Cited

U.S. PATENT DOCUMENTS 4,339,634 A * 7/1982 Weber ........................ 200/5 A
4,687,941 A * 8/1987 Lasberg et al. ........... 250/506.1
5,163,646 A * 11/1992 Engelhardt .................. 248/118

* cited by examiner

Primary Examiner—Richard Hjerpe
Assistant Examiner—Peter Prizio

(57) ABSTRACT

The present invention provides an apparatus, a method and a system for reducing stress for a user's hands and fingers while operating a computer. The apparatus includes a fluid-filled structure proximate to the computer that encloses a fluid-proof keyboard. In one embodiment, the fluid-filled structure has a pair of detachable arm-hand inserts attached on one side, with each situated to permit at least a portion of an arm and a corresponding hand to be inserted within in a manner that facilitates operation of the fluid-proof keyboard. The apparatus further includes the fluid-proof keyboard, which is submerged in the fluid-filled structure proximate to the computer and which is coupled to the computer to provide for manual keyboard input to the computer.

27 Claims, 3 Drawing Sheets

FIG. 2    200

AQUA KEYBOARD

BACKGROUND OF THE INVENTION

The invention relates to the field of devices that enhance protection of the wrist from computer use stress, and more particularly, to the field of devices that relieve repetitive stress induced by computer keyboard use.

Personal computers are utilized more and more in business and in the home as well as for school. The increased use of personal computers has resulted in an increased occurrence of repetitive motion stress injuries such as carpal tunnel syndrone. A sheath type membrane called the carpel tunnel lies over a U-shaped bone and cartilege combination in the wrist of a human. The carpel tunnel permits the median nerve, tendons and other tissues to pass over the wrist joint to the hand. When the median nerve and/or tendons slide over the wrist bones more frequently, they may become irritated and inflamed. Repeated injury of the nerves, tendons and other tissues in the wrist results in Carpal Tunnel Syndrone, which is evidenced by chronic, acute pain in the wrists and hands.

A number of devices have been created to relieve the stress on human wrists when operating computer keyboards and computer mice. For example, U.S. Pat. No. 5,356,099 describes a wrist rest having a liquid pack that reduces the compression loading of the median nerve. U.S. Pat. Nos. 5,234,186 and 5,209,452 describe wrist rests that provide positioning of the wrist to relieve the stress that is believed to cause Carpel Tunnel Syndrome. Wrist rests that are solid or made from foam rubber provide some support, but are not completely effective in avoiding Carpel Tunnel Syndrome.

U.S. Pat. No. 5,566,913 provides an elastic envelope filled with gelatinous material to support the wrists. The wrist support may also be used as an exercise tool so that the individual may grip it with both hands and squeeze, thus exercising the hands and fingers.

However, there is a need for an apparatus, system and method for providing greater support for the wrist and fingers so that the risk of Carpal Tunnel Syndrome is minimized.

SUMMARY OF THE INVENTION

The present invention provides an apparatus, method and system for reducing stress for a user's hands and fingers while operating a computer. The apparatus includes a fluid-filled structure with arm-hand inserts which facilitate operation of a submerged fluid-proof keyboard. The fluid-filled structure is located proximate to the computer and encloses the fluid-proof keyboard. A pair of detachable arm-hand inserts are attached on one side of the fluid-filled structure so that at least a portion of an arm and a corresponding hand may be inserted and operate the fluid-proof keyboard. The fluid-proof keyboard is coupled to provide for manual keyboard input to the computer.

DETAILED DESCRIPTION OF THE PREFERRED EMBODIMENT

The present invention provides for Carpel Tunnel Syndrome stress relief and avoidance. By using fluid to help support the hands and wrists, as well as the fingers, the invention provides a less strained environment for entering information into a computer keyboard. The bouyancy of the fluid supports the hands and fingers, and where selected, the forearms, reducing the pressure on the muscles and tissues of the supported body part. Clearly, more dense fluids will provide greater support than less dense fluids. Thus, the user may select a fluid that is consistant with the degree of support desired.

Figure 1:
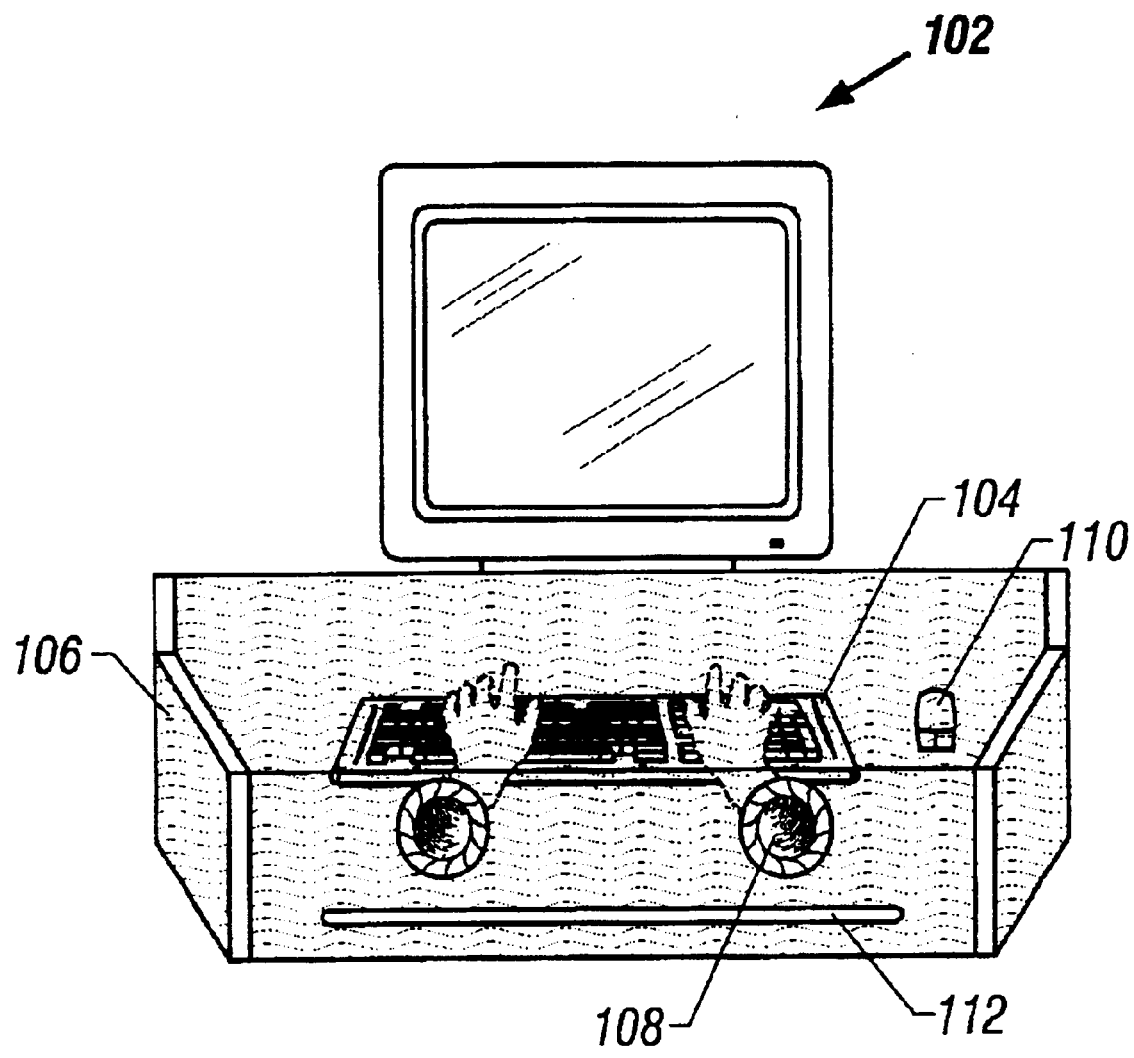
FIG. 1 is a perspective view of one embodiment of a computer with a fluid-proof keyboard in accordance with the present invention.

FIG. 1 is a perspective view of one embodiment of a computer 102 with a fluid-proof keyboard 104 in accordance with the present invention. FIG. 1 provides a representation of one embodiment of an apparatus for reducing stress for a user's hands and fingers while operating a computer. The apparatus includes a fluid-filled structure 106 proximate to the computer 102 and enclosing a fluid-proof keyboard 104. The fluid-filled structure 106 has a pair of detachable arm-hand inserts 108 attached on one side. Each insert 108 is situated to permit at least a portion of an arm and a corresponding hand to be inserted in a manner that facilitates operation of the fluid-proof keyboard. The inserts 108 are typically a consumable item, so that a suitable size may be selected by the user and may be replaced when the insert is worn out.

The fluid provides support for the hands, wrists and fingers. The term fluid-filled is defined as having sufficient fluid in the structure 106 to provide support for the wrists, hands and fingers. The temperature as well as the pressure may be adjusted for the comfort of the user. By utilizing different fluids, different degrees of support may be utilized. In one embodiment, the fluid utilized may be water. The fluid-proof keyboard 104 is submerged in the fluid-filled structure 106 proximate to the computer 102 and is coupled to the computer 102 to provide for manual keyboard input to the computer 102. The coupling of the fluid-proof keyboard 104 to the computer 102 may be wireless or hard-wired, as desired.

If desired, at least one fluid-proof peripheral 110, such as a computer mouse, for example, may be submerged in the fluid-filled structure 106. Coupling of the fluid-proof peripheral 110 may be accomplished wirelessly or by hard-wiring to the computer 102. Physical movement of the fluid-proof computer mouse or activation of a moveable portion, such as pressing a button on, or scrolling a wheel of, the fluid-proof computer mouse provides input to the computer 102.

Where desired, a plurality of different sized arm-hand inserts may be available so that the user may select a size of insert that best suits the proportions of his hands, wrists, and possibly arms. In addition, in one embodiment, the fluid-filled structure may be substantially rectangular, with the detachable arm-hand inserts attached to a longer side of the rectangular structure.

A platform 112 may be provided for support of wrists and/or forearms. The platform 112 may be inside the fluid-filled structure, or, if desired, may be located outside the fluid-filled structure.

Figure 2:
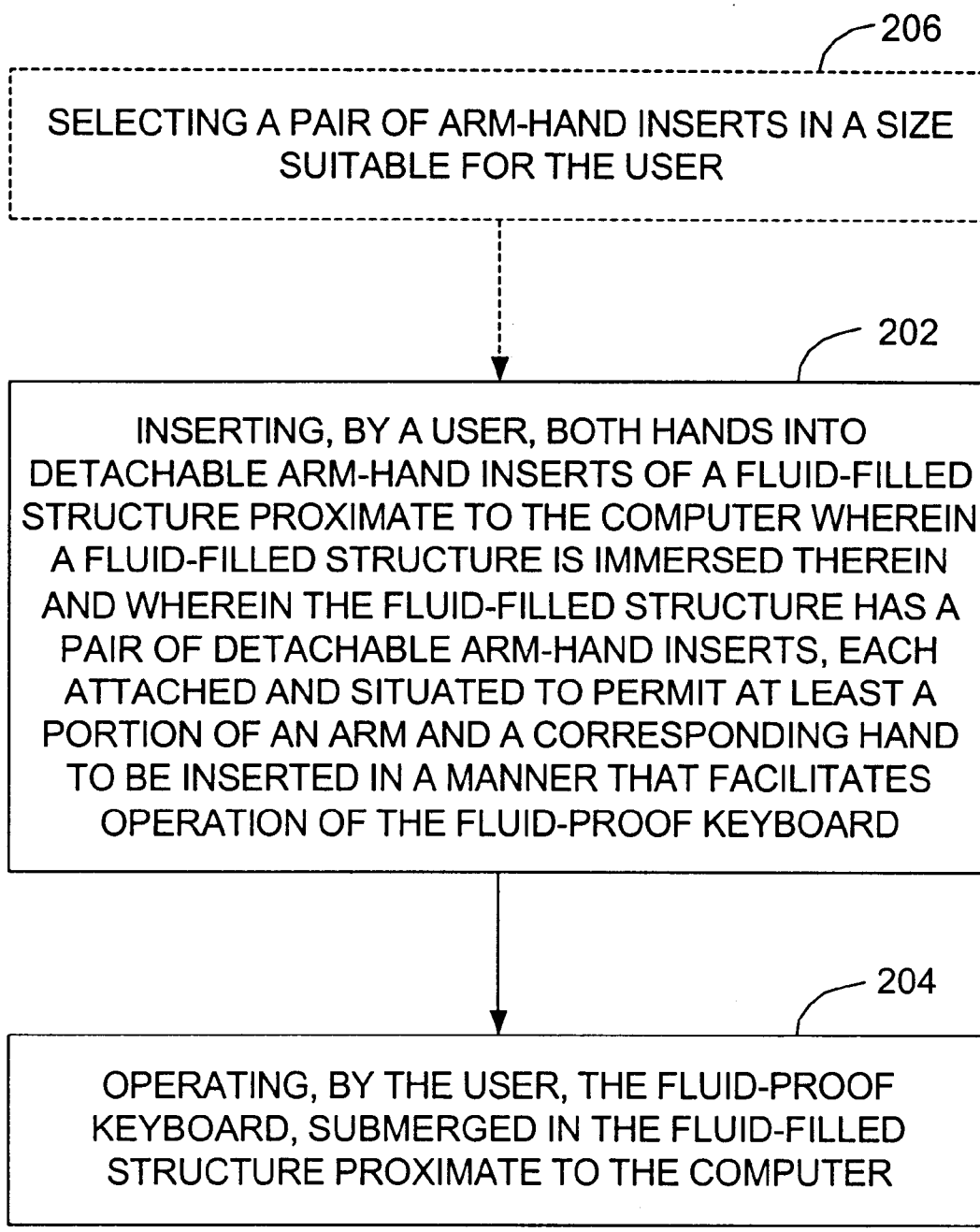
FIG. 2 is a flow chart of one embodiment of a method in accordance with the present invention.

FIG. 2 is a flow chart of one embodiment of a method in accordance with the present invention. The method 200 provides for reducing stress for a user's hands and fingers when operating a computer. First, the user inserts 202 both hands into detachable arm-hand inserts of a fluid-filled structure proximate to the computer. A fluid-proof keyboard is immersed in the fluid-filled structure. The pair of detachable arm-hand inserts are attached so that at least a portion of an arm and a corresponding hand may be inserted to operate the fluid-proof keyboard. In the next step, the user operates 204 the submerged fluid-proof keyboard, which sends signals to the computer either wirelessly or via hardwire. Where desired, operating the fluid-proof keyboard 204 may include utilizing at least one fluid-proof peripheral submerged in the fluid-filled structure and coupled to the computer to provide for manual peripheral input. Also, the step of operating may include utilizing a platform, located within the fluid-filled structure or adjacent to and outside of the fluid-filled structure, to support the wrists and/or forearms.

For example, the fluid-proof peripheral may be a fluid-proof computer mouse that sends signals to the computer by physical mouse movement or by moving a moveable portion, such as a scrolling wheel or button, of the mouse. Typically, a fluid such as water may be utilized in the invention. Where desired, before inserting the user's hands into the arm-hand inserts, the user may select 206 a desired size of inserts for use with the fluid-filled structure from a plurality of different sizes of available arm-hand inserts. If desired, the fluid-filled structure may be substantially rectangular.

Figure 3:
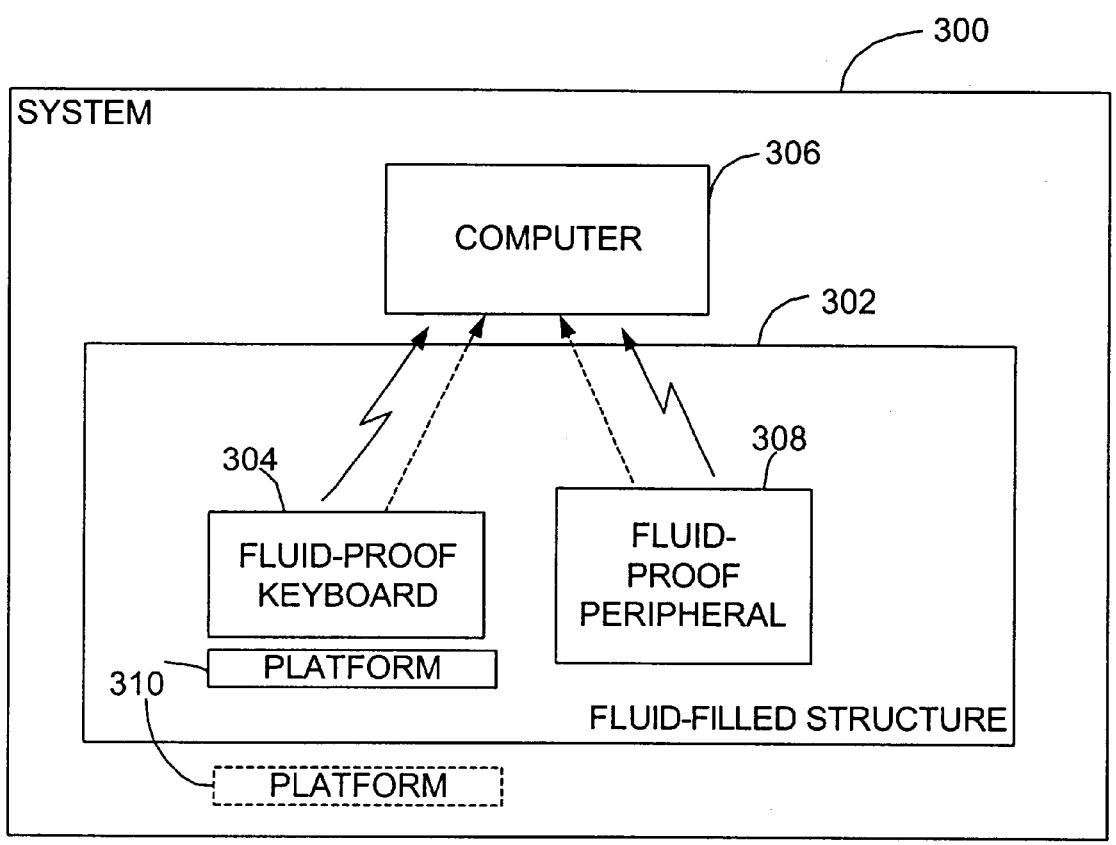
FIG. 3 is a block diagram of one embodiment of a system in accordance with the present invention.

FIG. 3 is a block diagram of one embodiment of a system in accordance with the present invention. The system 300 provides for minimizing Carpal Tunnel Syndrome stress in computer operation. The system includes a fluid-filled structure 302 having a fluid-proof computer keyboard 304 submerged therein and proximate to a computer. Typically, water may be utilized as the fluid. The fluid-proof computer keyboard 304 sends keyboard-entered information to the computer 306 either wirelessly or via hard-wiring. A pair of arm-hand sleeves 306 are installed in one side of the fluid-filled structure 302 so that the user may insert his hands into the sleeves to operate the computer 306.

If desired, at least one fluid-proof peripheral 308 such as a fluid-proof computer mouse may be submerged in the fluid-filled structure 302. The fluid-proof peripheral 308 is proximate to the computer and may be hard-wired to the computer 306, or alternatively, may communicate with the computer 306 wirelessly by the physical movement of the mouse or by movement of a button or scrolling unit on the mouse.

In addition, the system 300 may include a platform 310 that provides support for wrists and/or forearms. The platform 310 may be located within the fluid-filled structure 302 or outside and adjacent to the fluid-filled structure.

Thus, an apparatus, method and system have been described according to the present invention. Many modifications and variations may be made to the techniques and structures described and illustrated herein without departing from the spirit and scope of the invention. Accordingly, it should be understood that the apparatus, method and system described herein are illustrative only and are not limiting upon the scope of the invention.

What is claimed is:

1. An apparatus for reducing stress for a user's hands and fingers while operating a computer, comprising:
    a fluid-filled structure proximate to the computer and enclosing a fluid-proof keyboard, wherein the fluid-filled structure has a pair of detachable arm-hand inserts attached on one side, with each insert situated to permit at least a portion of an arm and a corresponding hand to be inserted within the detachable arm-hand insert in a manner that facilitates operation of the fluid-proof keyboard; and
    the fluid-proof keyboard, submerged in the fluid-filled structure proximate to the computer and coupled to the computer to provide for manual keyboard input to the computer.

2. The apparatus of claim 1 further including at least one fluid-proof peripheral submerged in the fluid-filled structure and coupled to the computer to provide for manual peripheral input.

3. The apparatus of claim 2 wherein the at least one fluid-proof peripheral is a fluid-proof computer mouse proximate to the fluid-proof keyboard and arranged to send signals to the computer in accordance with at least one of: movement of the fluid-proof computer mouse and activation of a moveable portion of the fluid-proof computer mouse.

4. The apparatus of claim 2 wherein the fluid-proof keyboard is coupled to the computer via one of: wireless connections and hard-wired connections.

5. The apparatus of claim 1 wherein the fluid is water.

6. The apparatus of claim 1 wherein the detachable arm-hand inserts are selectable from a plurality of arm-hand inserts in a plurality of sizes.

7. The apparatus of claim 1 wherein the fluid-filled structure is substantially rectangular, with the detachable arm-hand inserts arranged on a longer side of the rectangular structure at a height that facilitates operation of the fluid-proof keyboard submerged therein.

8. The apparatus of claim 1 further including a platform that provides support for at least one of: wrists and forearms.

9. The apparatus of claim 8 wherein the platform is located in one of the following locations: inside the fluid-filled structure and proximate an outer side of the fluid-filled structure.

10. A method for reducing stress for a user's hands and fingers when operating a computer, comprising the steps of:
    inserting, by a user, both hands into detachable arm-hand inserts of a fluid-filled structure proximate to the computer wherein a fluid-proof keyboard is immersed therein, and wherein the fluid-filled structure has a pair of detachable arm-hand inserts, each attached and situated to permit at least a portion of an arm and a corresponding hand to be inserted in a manner that facilitates operation of the fluid-proof keyboard; and
    operating, by the user, the fluid-proof keyboard, submerged in the fluid-filled structure proximate to the computer and coupled to communicate with the computer.

11. The method of claim 10 further including a step of utilizing at least one fluid-proof peripheral submerged in the fluid-filled structure and coupled to the computer to provide for manual peripheral input.

12. The method of claim 11 wherein the at least one fluid-proof peripheral is a fluid-proof computer mouse proximate to the fluid-proof keyboard and arranged to send signals to the computer in accordance with at least one of: movement of the fluid-proof computer mouse and activation of a moveable portion of the fluid-proof computer mouse.

13. The method of claim 10 wherein the fluid-proof keyboard is coupled to the computer via one of: wireless connections and hard-wired connections.

14. The method of claim 10 wherein the fluid is water.

15. The method of claim 10 further including, prior to inserting, by a user, both hands into detachable arm-hand inserts, selecting a pair of arm-hand inserts in a size suitable for the user from a plurality of arm-hand inserts and affixing the arm-hand inserts selected to the fluid-filled structure.

16. The method of claim 10 wherein the fluid-filled structure is substantially rectangular, with the detachable arm-hand inserts arranged on a longer side of the rectangular structure at a height that facilitates operation of the fluid-proof keyboard submerged therein.

17. The method of claim 10 wherein the step of operating includes utilizing a platform to support for at least one of: wrists and forearms.

18. The method of claim 17 wherein the platform is located in one of the locations: inside the fluid-filled structure and proximate an outer side of the fluid-filled structure.

19. A system for minimizing Carpal Tunnel Syndrome stress in computer operation, comprising:
- a fluid-filled structure having a fluid-proof computer keyboard situated therein and proximate to a computer;
- the fluid-proof computer keyboard submerged in the fluid-filled structure and being arranged to send keyboard-entered information to the computer; and
- a pair of arm-hand sleeves, installed in one side of the fluid-filled structure, arranged to facilitate operation of the computer.

20. The system of claim 19 further including at least one fluid-proof peripheral submerged in the fluid-filled structure and coupled to the computer to provide for manual peripheral input.

21. The system of claim 20 wherein the at least one fluid-proof peripheral is a fluid-proof computer mouse proximate to the fluid-proof keyboard and arranged to send signals to the computer in accordance with at least one of: movement of the fluid-proof computer mouse and activation of a moveable portion of the fluid-proof computer mouse.

22. The system of claim 21 wherein the fluid-proof computer mouse is coupled to the computer via one of: wireless connections and hard-wired connections.

23. The system of claim 19 wherein the fluid-proof computer keyboard is coupled to the computer via one of: wireless connections and hard-wired connections.

24. The system of claim 19 wherein the fluid is water.

25. The system of claim 19 further including a platform that provides support for at least one of: wrists and forearms.

26. The system of claim 25 wherein the platform is located in one of the following locations: inside the fluid-filled structure and proximate an outer side of the fluid-filled structure.

27. The system of claim 19 wherein at least one of: temperature and pressure of the fluid is adjustable.

* * * * *